US009081817B2

United States Patent
Arasu et al.

(10) Patent No.: US 9,081,817 B2
(45) Date of Patent: Jul. 14, 2015

(54) ACTIVE LEARNING OF RECORD MATCHING PACKAGES

(75) Inventors: Arvind Arasu, Bothel, WA (US); Michaela Götz, Ithaca, NY (US); Shriraghav Kaushik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 13/084,527

(22) Filed: Apr. 11, 2011

(65) Prior Publication Data

US 2012/0259802 A1   Oct. 11, 2012

(51) Int. Cl.
G06F 17/30 (2006.01)
G06N 99/00 (2010.01)

(52) U.S. Cl.
CPC ........ *G06F 17/30507* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,960,430 A | 9/1999 | Haimowitz et al. | |
| 6,961,721 B2 | 11/2005 | Chaudhuri et al. | |
| 7,287,019 B2 | 10/2007 | Kapoor et al. | |
| 7,634,464 B2 | 12/2009 | Chen et al. | |
| 2003/0126102 A1* | 7/2003 | Borthwick | 706/21 |
| 2007/0294221 A1 | 12/2007 | Chen et al. | |
| 2008/0077573 A1 | 3/2008 | Weinberg et al. | |
| 2008/0183693 A1* | 7/2008 | Arasu et al. | 707/5 |
| 2008/0306945 A1 | 12/2008 | Chaudhuri et al. | |
| 2010/0198756 A1 | 8/2010 | Zhang et al. | |

OTHER PUBLICATIONS

Sarawagi, et al., "Interactive deduplication using active learning", In Proceedings of the eighth ACM SIGKDD international conference on Knowledge discovery and data mining, Jul. 2002, pp. 269-278.*
Bilenko, "Learnable Similarity Functions and Their Application to Record Linkage and Clustering", The University of Texas at Austin, Aug. 2006, pp. 1-152.*
Chaudhuri, et al., "Robust and Efficient Fuzzy Match for Online Data Cleaning", in Proceedings of the 2003 ACM SIGMOD international conference on Management of data, Jun. 9-12, 2003, pp. 313-324.

(Continued)

*Primary Examiner* — Jeffrey A Gaffin
*Assistant Examiner* — Paulinho E Smith
(74) *Attorney, Agent, or Firm* — Cassandra Swain; Judy Yee; Micky Minhas

(57) ABSTRACT

An active learning record matching system and method for producing a record matching package that is used to identify pairs of duplicate records. Embodiments of the system and method allow a precision threshold to be specified and then generate a learned record matching package having precision greater than this threshold and a recall close to the best possible recall. Embodiments of the system and method use a blocking technique to restrict the space of record matching packages considered and scale to large inputs. The learning method considers several record matching packages, estimates the precision and recall of the packages, and identifies the package with maximum recall having precision greater than equal to the given precision threshold. A human domain expert labels a sample of record pairs in the output of the package as matches or non-matches and this labeling is used to estimate the precision of the package.

19 Claims, 8 Drawing Sheets

(56) References Cited

OTHER PUBLICATIONS

Ananthakrishna, et al., "Eliminating fuzzy duplicates in data warehouses", In Proceedings of the 28th international conference on Very Large Data Bases, Aug. 2002, pp. 586-597.
Arasu, et al., "Efficient exact set-similarity joins", In Proceedings of the 32nd international conference on Very large data bases, Sep. 12-15, 2006, pp. 918-929.
Argamon-Engelson, et al., "Committee-based sample selection for probabilistic classifiers", in Journal of Artificial Intelligence Research, vol. 11, 1999, pp. 335-360.
Bilenko, et al., "Adaptive product normalization: Using online learning for record linkage in comparison shopping", in Proceedings of the Fifth IEEE International Conference on Data Mining, Nov. 2005, pp. 58-65.
Bilenko, et al., "Adaptive blocking: Learning to scale up record linkage", In Proceedings of the Sixth International Conference on Data Mining, Dec. 18-22, 2006, pp. 87-96.
Bilenko, et al., "Adaptive duplicate detection using learnable string similarity measures", In Proceedings of the Ninth ACM SIGKDD International Conference on Knowledge Discovery and Data Mining, Aug. 24-27, 2003, pp. 39-48.
Bilenko, et al., "On evaluation and training-set construction for duplicate detection", In Proceedings of the KDD-2003 Workshop on Data Cleaning, Record Linkage, and Object Consolidation, Aug. 2003, pp. 7-12.
Chandel et al., "Benchmarking declarative approximate selection predicates", In Proceedings of the 2007 ACM SIGMOD international conference on Management of data, Jun. 12-14, 2007, pp. 353-364.
Chaudhuri, et al., "Example-driven design of efficent record matching queries", In Poceedngs of the 33rd international conference on Very large data bases, Sep. 23-28, 2007, pp. 327-338.
Chaudhuri, et al. "A primitive operaor for similarity joins in data cleaning", In Proeedings of the 22nd Intenatonal Conference on Data Engineering, Apr. 3-7, 2006.
Cohen, William W., "Data integration using similarity joins and a word-based information representation language", in ACM Transactions on Information Systems (TOIS), Jul. 2000, vol. 18, Issue 03, pp. 288-321.
Dagum, et al., "An optimal algorithm for monte carlo estimation", In Proceedings of the 36th Annual Symposium on Foundations of Computer Science, Oct. 23-25, 1995, pp. 1-22.
Dong, et al., "Reference reconciliation in complex information spaces", In Proceedings of the 2005 ACM SIGMOD international conference on Management of data, Jun. 2005, pp. 85-96.
Freund, et al., "Selective sampling using the query by committee algorithm", in Machine Learning, vol. 28, Issue 02-03, Aug.-Sep. 1997, pp. 133-168.
Gravano, et al., "Approximate string joins in a database (almost) free", In Poceedings of the 27th International Very Large Data Bases, Sep. 2001, pp. 491-500.
Gunopulos, et al., "Discovering all most specific sentences", ACM Transactions on Database Systems (TODS), vol. 28, Issue 02, Jun. 2003, pp. 140-174.
Hadjieleftheriou, et al., "Fast indexes and algorithms for set similarity selection queries", In Proceedings of the 2008 IEEE 24th International Conference on Data Engineering, Apr. 7-12, 2008, pp. 267-276.
Hanneke, Steve, "A bound on the label complexity of agnostic active learning", In Proceedings of the 24th international conference on Machine learning, 2007, pp. 353-360.
Hernandez, et al., "The merge/purge problem for large databases", In Proceedings of the 1995 ACM SIGMOD international conference on Management of data, vol. 24. Issue 02, May 1995, pp. 127-138.
Karp, et al., "Noisy binary search and its applications", In Proceedings of the eighteenth annual ACM-SIAM symposium on Discrete algorithms, Jan. 2007, pp. 881-890.
Li, et al., "Vgram: Improving performance of approximate queries on string collections using variable-length grams", In Proceedings of the 33rd International conference on Very large data bases, Sep. 23-28, 2007, pp. 303-314.
McCallum, et al., "Efficient clustering of high-dimensional data sets with application to reference matching", In Proceedings of the sixth ACM SIGKDD international conference on Knowledge discovery and data mining, Aug. 2000, pp. 169-178.
Monge, et al., "An efficient domain-independent algorithm for detecting approximately duplicate database records", In Proceedings of the 1st SIGMOD workshop on data mining and knowledge discovery, May 1997.
Noren, et al., "A hit-miss model for duplicate detection in the who drug safety database", In Proceedings of the eleventh ACM SIGKDD international conference on Knowledge discovery in data mining, Aug. 2005, pp. 459-468.
Sarawagi, et al., "Efficient set joins on similarity predicates", In Proceedings of the 2004 ACM SIGMOD international conference on Management of data, Jun. 13-18, 2004, pp. 743-754.
Domingos, et al., "Multi-relational record linkage", In Proceedings of the 3rd KDD Workshop on Multi-Relational Data Mining, Aug. 2004, pp. 1-18.
Tejada, et al., "Learning object identification rules for information integration", in Information Systems—Data extraction, cleaning and reconciliation, vol. 26, Issue 08, Dec. 2001, pp. 607-633.
Tong, et al., "Support vector machine active learning with applications to text classification", Proceedings of the Seventeenth International Conference on Machine Learning, vol. 02, 2001, pp. 45-66.
Zadrozny, et al., "Learning and making decisions when costs and probabilities are both unknown", In Proceedings of the seventh ACM SIGKDD international conference on Knowledge discovery and data mining, Jan. 2001, pp. 1-24.

\* cited by examiner

ACTIVE LEARNING OF RECORD MATCHING PACKAGES

BACKGROUND

Record matching refers to identifying matching or duplicate records, where the records correspond to the same real-world entity. One type of record matching task is to identify bibliographic records in a first database that correspond to the same publication in a second database. The goal of record matching in this case is to find pairs of records that represent the same bibliographic record.

Record matching has applications in information integration, data warehousing, census data, and health-care records management. The standard approach to record matching is to find textual similarity between records. This is typically done by computing a variety of similarity scores for a candidate pair of records. These scores then are combined using some logic to determine if the pair is a match. A similarity score quantifies textual similarity between the two records on some subset of attributes. The similarity score is computed using a string similarity function such as edit distance, jaccard, and cosine similarity. These similarity scores are combined to generate a final similarity score, which is then used to determine whether two records are matches.

Manually generating logic for combining similarity scores, however, can be difficult. This is why many record matching techniques use a learning-based approach. In the learning-based approach, record matching is viewed as a classification problem, where each pair has to be classified as a match or a non-match, and a suitable classifier is learned using labeled examples of matching and non-matching pairs.

One issue, however, is how to select the labeled examples. One type of learning-based approach uses passive learning. In the passive learning approach a user manually selects a set of examples to be labeled. Another type of learning-based approach uses active learning. Active learning is a form of machine learning where the learning algorithm obtains selects the set of examples to be labeled. Active learning is important in record matching because manually identifying a suitable set of examples to label can be difficult.

One limitation, however, of existing active learning record matching techniques is that they do not allow a user to control the quality of the learned classifier. Stated in informal terms, the quality of a classifier in record matching is measured using its precision and recall. The recall of a classifier is the number of pairs that it classifies as a match and the precision is the fraction of these pairs that are true matches. But current active learning record matching techniques lack a systematic way of using the learning algorithm to ensure that the learned classifier has precision above some threshold. Moreover, the behavior of these algorithms can be unpredictable and precision and the recall of the learned classifier can decrease when more labeled examples are provided. This unpredictability makes it difficult to use these algorithms in record matching settings with specific quality requirements.

Another limitation of these existing active learning record matching techniques is that they do not scale to large inputs. For each requested label, these algorithms iterate over all record pairs, and the number of such pairs is quadratic in the input size. This limits the input size to the active learning record matching techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the active learning record matching system and method produce a record matching package. This record matching package then can be used to identify pairs of duplicate records. Embodiments of the active learning record matching system and method do not have the limitations of existing record matching techniques. In particular, embodiments of the active learning record matching system and method allow a user to specify a precision threshold as input. The learned record matching package has a precision greater than this threshold and has a recall close to the best possible recall given the precision constraint.

Embodiments of the active learning record matching system and method identify pairs of sample records to be labeled. These records are then labeled by a domain expert. These labeled examples are used by embodiments of the system and method to identify a record matching package with the desired precision. In some embodiments, a record pair contains a first record from a first set of records, and a second record from a second set of records.

Embodiments of the system and method input a first set of records, a second set of records, a package type, and a precision threshold. The precision threshold represents a minimum value of precision desired for a record matching package. A blocking technique is used to limit the space of record matching packages considered to allow scaling to large input sizes. In particular, the blocking technique involves a binary blocking function and only record matching packages that are conjunctions of the blocking function and another predicate are considered by the system. The blocking technique identifies all pairs of records, one from each input set that satisfy the blocking function. The identified pairs then are used to estimate precision and recall of candidate record matching packages.

A learning method is determined based on the package type of a record matching package, and a selected learning method is obtained. A record matching package is generated using the selected learning method. The learning method considers various record matching packages. For each considered record matching package it invokes the active learning precision estimation module to compute the precision of the package. Also, for each considered record matching package it invokes the recall estimation module to compute the recall of the package. The learning method outputs the record matching package having the highest recall and precision that is greater than or equal to the precision threshold among the considered packages.

An active learning precision estimation module is used compute the precision of a candidate record matching package considered by the learning method. This is achieved by randomly selecting a record pair from the first subset of records and the second subset of records that satisfy the candidate record matching package predicate. In an iterative manner the set of labeled examples is generated. The labeled examples are used to calculate precision of the candidate record matching package. A recall estimation module is used to compute the recall of a candidate record matching package. This is achieved by counting the number of record pairs in the first subset of records and the second subset of records that satisfy the record matching package predicate.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of an active learning record matching system and method reference is made to the accompanying drawings, which form a part thereof, and in which is shown by way of illustration a specific example whereby embodiments of the active learning record matching system and method may be practiced. It is to be understood that other embodiments may be utilized and structural changes may be made without departing from the scope of the claimed subject matter.

I. System Overview

Figure 1:
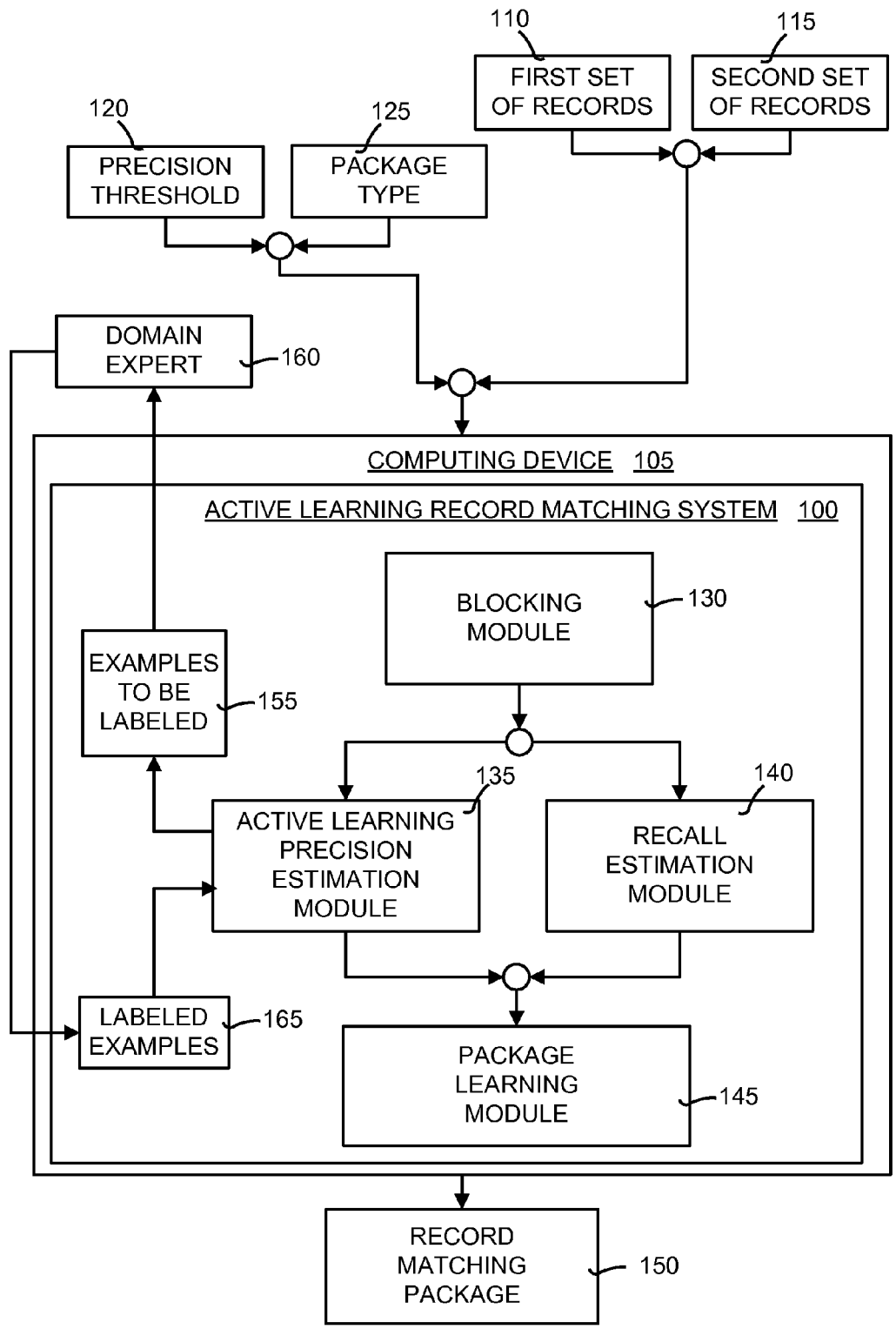
FIG. 1 is a block diagram illustrating a general overview of embodiments of the active learning record matching system and method implemented in a computing environment.

FIG. 1 is a block diagram illustrating a general overview of embodiments of the active learning record matching system and method implemented in a computing environment. As shown in FIG. 1, embodiments of the active learning record matching system 100 and method are implemented on a computing device 105. Embodiments of the active learning record matching system 100 and method include data input that includes a first set of records 110 and a second set of records 115.

Embodiments of the active learning record matching system 100 and method also have a configuration input. This configuration input includes a precision threshold 120 and a package type 125. The precision threshold guarantees that the learned classifier has a precision above the precision threshold 120. In some embodiments, the precision threshold 120 is selected by a user, while in other embodiments the active learning record matching system 100 and method automatically selects the precision threshold 120. The package type 125 determines which type of package will be learned.

Embodiments of the active learning record matching system 100 and method include a blocking module 130, an active learning precision estimation module 135, a recall estimation module 140, and a package learning module 145. The blocking module 130 is used to select the set of candidate pairs of records that satisfy a blocking function. Each candidate pair contains one record from the first set of input records and one record from the second set of input records. As explained in detail below, the blocking module 130 improves efficiency and facilitates the scaling of embodiments of the active learning record matching system 100 and method to large inputs. In general, the blocking module 130 achieves this by limiting the numbers of record pairs that are iterated over.

The package learning module 145 includes at least two package learning techniques that depend on which package type is input. A first package learning technique is a conjunction-of-similarity predicates learning technique that uses a simple class of threshold functions obtained by conjunction of threshold predicates. A second package learning technique is an s-term disjunctive normal form (DNF) learning technique that uses the s-term DNF to learn the record matching package 150. The output of embodiments of the active learning record matching system 100 and method is the record matching package 150.

The active learning precision estimation module 135 estimates the precision of a candidate record matching package considered by the learning algorithm. This is achieved by picking a random subset of (example) record pairs 155 that satisfy the candidate record matching package predicate. As shown in FIG. 1, the example record pairs 155 are output from the active learning precision estimation module 135. One or more human domain experts 160 then label these examples. The resulting labeled examples 165 are sent back to the active learning precision estimation module 135 to be used to estimate the precision of the candidate record matching package.

The recall estimation module 140 is used to estimate the recall of a candidate record matching package considered by the learning algorithm. The recall estimation module 140 counts the number of record pairs that satisfy the candidate record matching package predicate and returns this value.

II. Operational Overview

Figure 2:
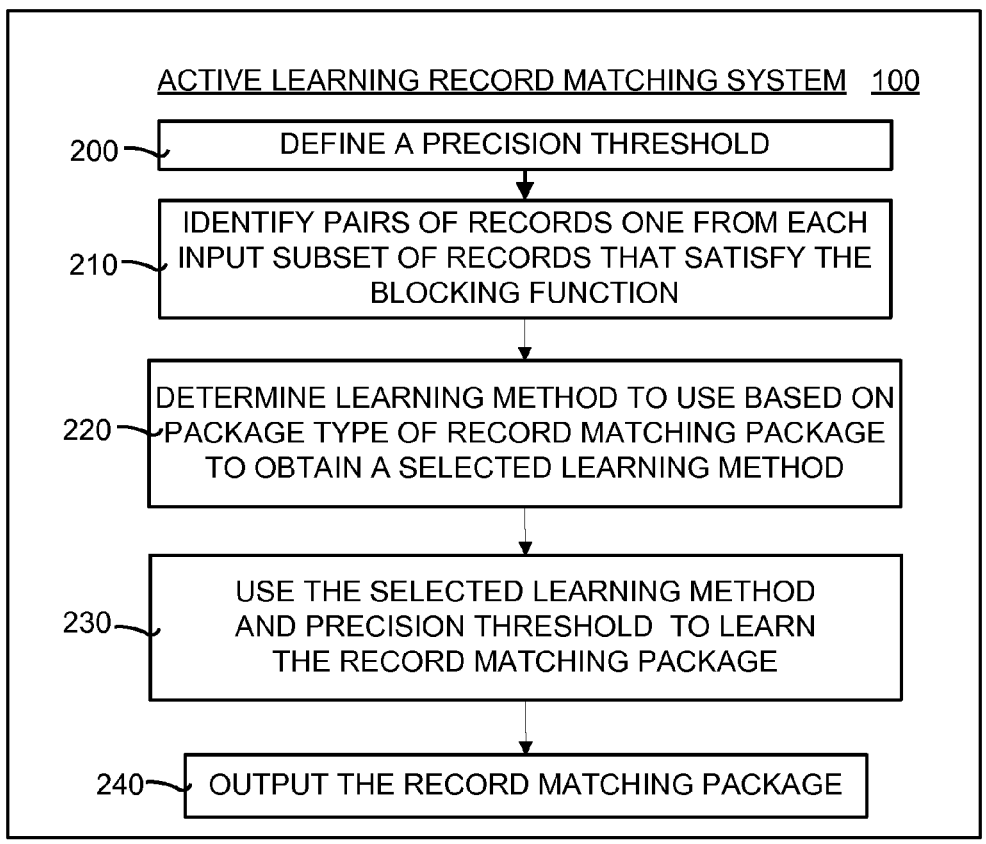
FIG. 2 is a flow diagram illustrating the general operation of embodiments of the active learning record matching system shown in FIG. 1.

FIG. 2 is a flow diagram illustrating the general operation of embodiments of the active learning record matching system 100 shown in FIG. 1. As noted above, embodiments of the active learning record matching system 100 mitigate the manual identification of a suitable set of labeled examples and allow a quality guarantee to be made such that only record matching packages above a certain precision are considered. Moreover, embodiments of the active learning record matching system 100 scale well to large input sizes.

Referring to FIG. 2, the operation of embodiments of the active learning record matching system 100 begins by defining a precision threshold 120 (box 200). This precision threshold 120 may be entered manually by a user or be determined by the system 100. The method then uses a blocking technique that selects a set of candidate pairs of records that satisfy a blocking function. Each candidate pair contains one record from the first set of input records and one record from the second set of input records. The blocking function can be provided as input or be determined by the system 100. Only record matching packages that are conjunctions of the blocking function and another predicate are considered by the system (box 210).

Next, the learning method to be used is determined based on the package type of record matching package such that a selected learning method is obtained (box 220). A record matching package is generated using the selected learning method (box 230). The learning method internally uses the active learning precision estimation module 135 and the recall estimation module 140 to calculate the precision and recall of candidate record matching packages. The learning method outputs the record matching package that has the highest recall among candidate record matching packages with precision greater than or equal to the precision threshold. The record matching package is then is output (box 240).

III. Operational Details

The operational details of embodiments of the active learning record matching system 100 and method will now be discussed. This includes the operation of the package learning module 145, the blocking module 130, the active learning precision estimation module 135, and the recall estimation module 140. Moreover, the conjunction-of-similarity predicates learning technique and the s-term DNF learning technique, which are both used in the package learning module 145, will be discussed.

III.A. Preliminaries

III.A.1. Active Learning

Embodiments of the active learning record matching system 100 and method use active learning for record matching. In active learning, the learning algorithm itself picks the examples to be labeled. The general idea is that the learning algorithm can exploit this additional flexibility to pick examples that are most informative for the learning task. This eliminates the user's burden of picking suitable examples or a good filter.

Embodiments of the active learning record matching system 100 and method can use decision trees and linear classifiers (which also include support vector machines (SVMs)). The techniques used in the embodiments of the active learning record matching system 100 and method differ from existing techniques in that they are designed from scratch for record matching and do not just invoke a known learning algorithm as a black box. This enables embodiments of the active learning record matching system 100 and method to exploit problem features that are specific to record matching. Embodiments of the active learning record matching system 100 and method can also be easily adapted to yield new learning algorithms in the traditional passive learning setting.

III.A.2. Precision and Recall

Mathematically, the record matching problem is the problem of identifying all pairs of matching records $(r, s) \in R \times S$, given two sets of input records, R and S. Two records match if they represent the same real-world entity. This notion of a match, however, lacks a precise characterization. A human judge would typically use a variety of semantic cues to determine if two records match or not.

Embodiments of the active learning record matching system 100 and method seek to learn a record matching package for inputs R and S. A record matching package for R and S is a program that performs record matching over them. In other words, its desired output is the set of all matching pairs $(r, s) \in R \times S$. Since record matching is an informally stated task, it is difficult to learn a "perfect" record matching package that produces exactly the desired output. Thus, embodiments of the active learning record matching system 100 and method seek to produce a record matching package that closely approximates the ideal output.

The degree of approximation is typically measured using two statistics, namely, precision and recall. The precision of a record matching package is defined as the fraction of predicted matches (pairs in its output) that are true matches. The recall of a package is defined as the number of predicted matches, or in other words its output size. This definition differs from the classical definition from information retrieval because the fraction of true matches that are also predicted as matches by a package. It should be noted that the definition used in this is document is simpler to calculate, while retaining the utility of the classical definition for purposes of comparing different packages.

Given a record matching package, embodiments of the active learning record matching system 100 and method can compute its precision and recall. The recall of the package is its output size. The precision of the package can be estimated by labeling a random sample of output records.

It is desirable to obtain record matching packages having high precision and recall. However, maximizing precision and maximizing recall are conflicting goals: precision is increased at the cost of recall and vice-versa. For example, the record matching package that outputs the entire $(R \times S)$ has high recall but is likely to have low precision. Similarly, the package that outputs only identical records as matches is likely to have high precision, but low recall. The above discussion raises the question of how the "best" package is defined. Embodiments of the active learning record matching system 100 and method seek to produce a record matching package that maximizes recall while ensuring that the precision is at least $\tau$ for some input threshold $\tau \in [0, 1]$.

III.A.3. Similarity Space

As mentioned above, record matching packages use textual similarity between two records to decide if they are matches or not. Formally, assume that there exists d predefined similarity dimensions for a given record matching task:

$$\overline{F} = F_1, \ldots, F_d.$$

A similarity dimension measures the similarity between an attribute of R and an attribute of S using a similarity function. Without loss of generality, it can be assumed that all similarity functions return values in the range [0, 1]. Every pair $(r, s) \in R \times S$ can be mapped to a d-dimensional similarity vector, $$\langle f_1, \ldots, f_d \rangle \in [0,1]^d,$$

which is denoted as, $$\overline{F}(r,s)$$

Note that $f_i$ is the similarity between r and S on dimension $F_i$. In machine learning terminology, $$\overline{F}(r,s)$$

is the feature vector which forms the basis for classifying the pair as a match or non-match. The space of vectors in $[0, 1]^d$ is called the similarity space.

III.A.4. Record Matching Package Classes

A record matching package M is conceptually a classifier that classifies a record pair as a match or a non-match based on their similarity vector. Formally, M is a binary function with signature, $$[0,1]^d \rightarrow \{\text{true}, \text{false}\}.$$

A pair, $(r, s) \in R \times S$, is classified as a match if, $$\mathcal{M}(\overline{F}(r,s)) = \text{true},$$

and a non-match if, $$\mathcal{M}(\overline{F}(r,s)) = \text{false}.$$

Note that in the following discussion, $$\mathcal{M}(\overline{F}(r,s))$$

is shortened to, $$\mathcal{M}(r,s).$$

Two popular and well-studied classifiers for record matching are support vector machines (SVMs) and decision trees. It has been shown that other common classifiers (such as naive Bayes) are less suited for record matching compared to SVMs and decision trees. It is possible to define two classes of binary functions, namely, a threshold-based boolean function and linear classifiers, which subsume decision trees and SVMs. In particular, threshold-based boolean functions are generalizations of decision trees, while SVMs (without the kernel trick) are instances of linear classifiers.

Mathematically, a threshold-based boolean function (hereafter, a threshold function) is defined as boolean formula whose basic propositions are of the form ($F_i \geq \theta$). For a similarity vector, $$f = \langle f_1, \ldots, f_d \rangle,$$

the predicate ($F_i \geq \theta$) evaluates to true if and only if $f_i > \theta$.

Mathematically, a linear classifier, L, is of the form, $$\Sigma_i w_i F_i \geq 1,$$

where, $$w_i, i \in [1, d]$$

are real numbers. L evaluates a similarity vector, $$f = \langle f_1, \ldots, f_d \rangle,$$

to true if and only if, $$\Sigma_i w_i f_i \geq 1.$$

III.A.5. Basic Problem Formulation

The problem of learning a record matching package can be stated as follows: Given two sets of input records R and S, a set of predefined similarity dimensions, $$\vec{F} = F_1, \ldots, F_d,$$

over schema of R and S, and a precision threshold τ, learn a record matching package (belonging to one of the two classes above) with precision at least τ that maximizes recall. Embodiments of the active learning record matching system 100 and method have access to a human labeler (such as the domain expert 160 in FIG. 1), who can label selected pairs, $$(r, s) \in R \times S$$

as a match or a non-match.

Any algorithm for the learning problem has two associated costs, namely labeling cost and computational cost. It is desirable to minimize these costs. The labeling cost is the number of examples for which it requests labels and the computational cost is the time it takes to produce its output. It appears that labeling is a more expensive resource, so embodiments of the active learning record matching system 100 and method seek to minimize labeling cost, while keeping the computational cost within reasonable limits.

III.B Monotonicity of Precision

III.B.1. Definitions

Informally, it is expected that a pair of records that is textually similar will be more likely a match than a pair that is not. This observation can be exploited while learning record matching packages. This observation is called monotonicity of precision.

Mathematically, a partial ordering, which is denoted as:

$$(\preceq),$$

is defined on points in similarity space. Let, $$f = \langle f_1, \ldots, f_d \rangle$$

and $$g = \langle g_1, \ldots, g_d \rangle$$

be two points in $[0, 1]^d$. It can be said that g dominates f, denoted as, $$g \succeq f,$$

or equivalently, as $$f \preceq g,$$

if $f_i \leq g_i$ for all $1 \leq i \leq d$. If $$f \preceq g \text{ and } f_i \neq g_i,$$

for some $1 \leq i \leq d$, then it can be denoted as, $$f \prec g,$$

or, equivalently as, $$g \succ f.$$

A closed region C in similarity space is a set of points with the property that any two points in C can be connected by a curve that lies wholly within C. It can be said that a closed region $C_1$ dominates a closed region $C_2$, denoted as, $$C_1 \succeq C_2,$$

if every point in $C_1$ dominates every point in $C_2$.

Given input tables R and S, the precision of a closed region C, which is denoted as Prec(C), is define as the fraction of matches among pairs, $$(r, s) \in R \times S$$

that belong to C. This can be denoted as, $$\vec{F}(r, s) \in C.$$

Similarly, the recall of C, which is denoted as Recall(C), is defined as the number of pairs, $$(r, s) \in R \times S$$

that belong to C.

A definition can be set forth as follows. Given input tables R and S, a set of similarity dimensions, $$\vec{F} = F_1, \ldots, F_d,$$

it can be said that precision is monotonic with respect to similarity if for any two closed regions, $$\dot{C}_1 \succeq C_2$$

in $[0, 1]^d$, Prec($C_1$)≥Prec($C_2$). If precision is monotonic with respect to similarity, then it can be said that the monotonicity assumption holds.

This monotonicity assumption, while intuitive, is not universally valid. A set of meaningless similarity dimensions can be constructed for which the precision is not monotonic. Even for standard similarity functions and real-world record matching tasks, the monotonicity assumption is not valid at the record level, since a non-matching record pair whose similarity vector dominates that of a matching record pair can usually be found.

However, in practice, the monotonicity assumption generally holds when the recall of $C_1$ and $C_2$ is high. In other words, the monotonicity assumption holds in "aggregation" when both $C_1$ and $C_2$ contain a large number of record pairs, $$(r, s) \in R \times S.$$

III.C. Details of Modules and Techniques

This section will discuss the details of techniques and methods used by embodiments of the active learning record matching system 100 and method for producing record matching packages. For simplicity, these techniques and operation of modules are presented without the blocking function. Exploiting blocking functions is discussed afterwards.

III.C.1. Package Learning Module

Figure 3:
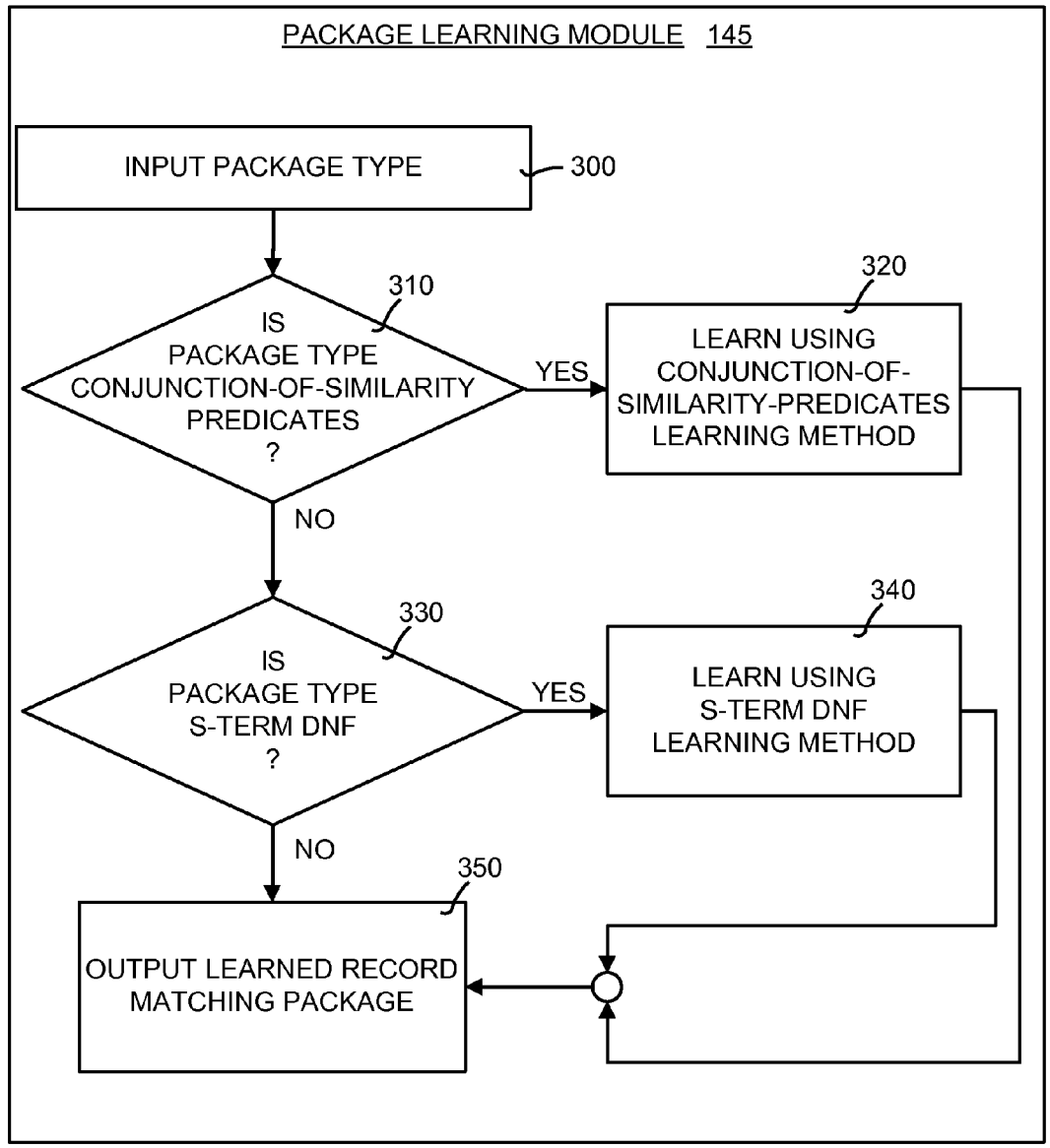
FIG. 3 is a flow diagram illustrating the operational details of embodiments of the package learning module shown in FIG. 1.

In general, embodiments of the package learning module 145 are used to learn the record matching package 150. FIG. 3 is a flow diagram illustrating the operational details of embodiments of the package learning module 145 shown in FIG. 1. The operation of the module 145 begins by receiving the input of the package type (box 300). A decision then is made as whether the package type is a conjunction-of-similarity predicates package type (box 310). If so, then the learning is done by the package learning module 145 uses a using conjunction-of-similarity predicates learning technique (box 320). The conjunction-of-similarity predicates learning technique uses a simple class of threshold functions obtained by conjunction of threshold predicates. This learning technique is discussed in detail below.

If the package type is not a conjunction-of-similarity predicates package type, then the module 145 makes another determination as to whether the package type is an s-term disjunctive normal form (DNF) package type (box 330). If so, then the learning is done by the package learning module 145 using the s-term DNF learning technique (box 340). This learning technique is also discussed in detail below. The module 145 then outputs the learned record matching package (box 350).

III.C.2. Conjunction-of-Similarity Predicates Learning Technique

Figure 4:
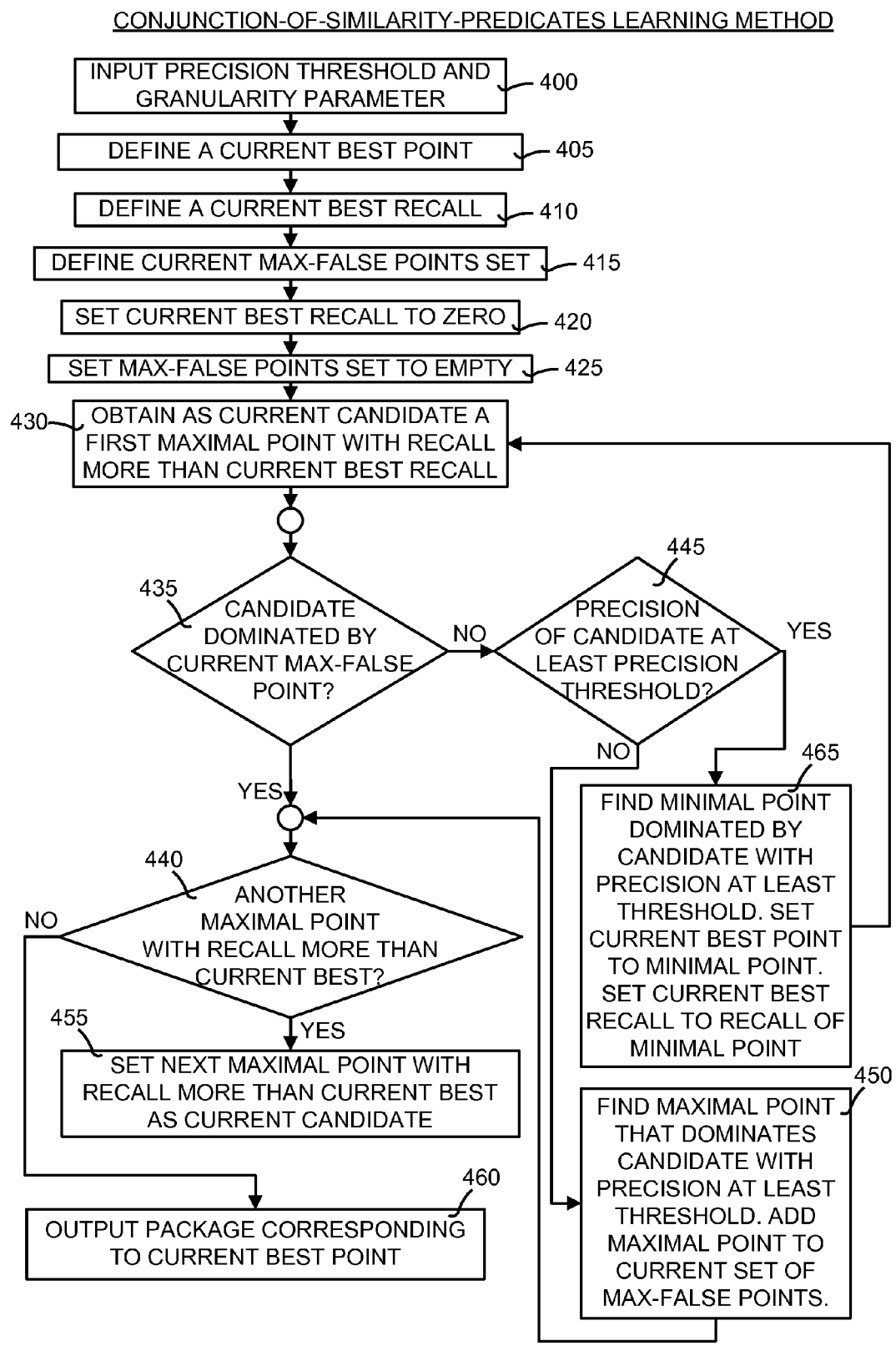
FIG. 4 is a flow diagram illustrating the details of the conjunction-of-similarity predicates learning technique used in some embodiments of the package learning module shown in FIGS. 1 and 3 for a first package type.

When the package type is a conjunction-of-similarity predicates package type, then embodiments of the package learning module 145 use a simple class of threshold functions obtained by conjunction of threshold predicates. FIG. 4 is a flow diagram illustrating the details of the conjunction-of-similarity predicates learning technique used in some embodiments of the package learning module 145 shown in FIGS. 1 and 3 for a first package type.

The operation of the technique begins by inputting a precision threshold and a granularity parameter (box 400). Next, a current best point is defined (box 405), a current best recall is defined (box 410), and a current max-false point set is defined (box 415). The current best recall then is set to zero (box 420) and the max-false points set is set to empty (box 425).

Next, the technique obtains a first maximal point having a recall more than the current best recall and calls this the current candidate (box 430). A determination then is made as to whether the current candidate is dominated by a current max-false point (box 435). If so, then another determination is made as to whether there exists another maximal point having recall more than the current best recall (box 440). If the current candidate is not dominated by a current max-false point, then another determination is made as to whether the precision of candidate is at least the precision threshold (box 445).

If the precision of candidate is not at least the precision threshold, then the technique finds a maximal point that dominates the candidate with precisions at least equal to the precision threshold, and that maximal point is added to the current set of max-false points (box 450). The determination then is made as to whether there exists another maximal point having recall more than the current best recall (box 440). If so, then the next maximal point having recall more than the current best recall is set as the current candidate (box 455). If not, the method outputs the package corresponding to a current best point (box 460).

If the precision of candidate is not at least the precision threshold (box 445), then the technique finds a minimal point dominated by a candidate having a precision that is at least equal to the threshold (box 465). Moreover, the current best point is set to a minimal point, and the current best recall is set to the recall of the minimal point.

Mathematically, without loss of generality, a function, M, belonging to this class is of the form, $$(F_1 \geq \theta_1) \wedge \ldots \wedge (F_d \geq \theta_d).$$

There exists a one-one correspondence between functions belonging to this class and points in the similarity space. The function, M, above corresponds to the point, $$p = \langle \theta_1, \ldots, \theta_d \rangle,$$

and note that for any $$f \in [0,1]^d, \mathcal{M}(f) = \text{true iff } p \preceq f.$$

Precision and recall of a point p (denoted Prec(p) and Recall (p)) are defined to be the precision and recall of its corresponding function. The problem of finding a function, M, with maximum recall such that $\text{Prec}(M) \geq \tau$ is therefore equivalent to the problem of finding a point $p \in [0, 1]^d$ with maximum recall and precision $\geq \tau$.

The naive algorithm enumerates all points $p \in [0, 1]^d$ and calculates their precision and recall. Among all points p with $\text{Prec}(p) \geq \tau$, it picks as its output the point with maximum recall.

The naive algorithm, however, is infeasible since there are an infinite number of points in $p \in [0, 1]^d$. Embodiments of the package learning module 145 and method use an approximation technique to make the number of points finite. This technique is called the conjunction-of-similarity predicates learning technique.

The conjunction-of-similarity predicates learning technique involves fixing an integer value k, called the granularity parameter. Then, a special set of $(k+1)^d$ points is defined, called points at granularity k, to be the set of all points of the form, $$p = \langle p_1, \ldots, p_d \rangle,$$

where each $p_i$ is of the form, $$j/k, j \in \{0, 1, \ldots, k\}.$$

If the similarity space is partitioned into $k^d$ identical cells with sides $(1/k)$, then the vertices of the cells correspond to the points at granularity k. Instead of considering all points in $[0, 1]_d$, the similarity threshold conjunction technique only considers points at granularity k, and outputs the point with maximum recall subject to the precision constraint. If M denotes the maximum number of pairs in (R×S) that belong to any single cell, then embodiments of the active learning record matching system 100 and method pick a point whose recall is at most M away from the optimal recall.

To implement the conjunction-of-similarity predicates learning technique, embodiments of the package learning module 145 compute the precision and recall of various points. Embodiments of the active learning record matching system 145 and method use the active learning precision estimation module 135 to compute precision of a point and the recall estimation module 140 to compute the recall of a point. It should be noted that a point is an instance of a binary function.

The cost of the conjunction-of-similarity predicates learning technique is analyzed by tracking the number of calls to these oracles that the technique makes. The implementation of these oracles is discussed below. As will be noted, computing precision requires human labeling while computing recall does not. Thus, embodiments of the active learning record matching system 100 and method seek to minimize the number of calls to the precision oracle.

III.C.2.a. Exploiting Monotonicity of Precision

The conjunction-of-learning predicates learning technique can be improved upon by exploiting monotonicity of precision with similarity. Mathematically, consider two points, $$p_1 \preceq p_2,$$

such that $Prec(p_1) \geq \tau$. If monotonicity of precision is assumed, then it can be proved that $Prec(p_2) \geq Prec(p_1) \geq \tau$.

It can also be observed that recall has an anti-monotonic property. Namely, if $$p_1 \preceq p_2$$

then $Recall(p_1) \geq Recall(p_2)$. This property follows from the definition of recall and, unlike monotonicity of precision, is unconditionally true.

The above discussion suggests that points such as $p_2$ that dominate another high-precision point can be removed from consideration. In other words, it is sufficient to consider points p that are "minimally precise," meaning any point $$p' \prec p$$

does not satisfy the precision constraint. This notion can be formalized with respect to an arbitrary monotonic binary predicate Pred. A monotonic binary predicate is simply a monotonic binary function, $$[0,1]^d \rightarrow \{true, false\}.$$

Given a monotone binary predicate, Pred, defined over points in $[0, 1]^d$, a point, $$p \in [0,1]^d$$

is minimally true (or MinTrue) if Pred(p)=true and, $$\forall p' \prec p \; Pred(p')=false.$$

MinTrue(Pred) denotes the set of all minimally true points for Pred.

The dual notion of maximally false is also useful. Given a monotone binary predicate Pred defined over points in $[0, 1]^d$, a point, $$p \in [0,1]^d$$

is maximally false (or MaxFalse) if Pred(p)=false and, $$\forall p' \succ p \; Pred(p')=true.$$

MaxFalse(Pred) is denoted as the set of all maximally false points for Pred. A point p is called a boundary point if it is either minimally true or maximally false. When considering points at some granularity k, the universal quantifier in the above definitions is with respect to points at granularity k.

Mathematically, embodiments of the package learning module 145 enumerate all MinTrue(Prec( )>$\tau$) points at granularity k, and output the one with best recall. First, a minimally true point is found starting with a true point p. The module 145 navigates through a sequence of points, $$p=p_0 \rightsquigarrow p_1 \rightsquigarrow \ldots \rightsquigarrow p_d,$$

and returns $p_d$ as its output.

Point $p_i$ agrees with $p_{i-1}$ on all dimensions except i. For dimension i, $p_i$ contains the smallest value v/k such that Pred ($p_i$) remains true. In some embodiments, the smallest value is found using binary search. It can be proven that the final point $p_d$ is minimally true and that, $$p_d \preceq p.$$

III.C.2.b. Boundary Determination

The package learning module 145 enumerate boundary points (MinTrue and MaxFalse) for a general monotonic binary predicate, Pred. In addition, a "current" set of minimally true and maximally false points is maintained. At each iteration, a new point is added to either the set of minimally true points or the set of maximally false points. a set of all maximal points p is maintained having the property, $$\forall p_{mt} \in MinTrueSet, p_{mt} \npreceq p,$$

and, $$\forall p_{mf} \in MaxFalseSet, p \npreceq p_{mf}.$$

The points p are maximal in the sense that no other point, $$p' \succ p,$$

has this property.

At each iteration, a point p is selected from a maximal candidate set. If the predicate of p, Pred(p)=false, then it can be proven that p is a maximally false point. In this case, the point p is added to the maximally false set. On the other hand, if the predicate of p, Pred(p)=true, then, by definition, there exists some minimally true point, $$p_{mt} \preceq p,$$

not in the current minimally true set. This point then is added to the minimally true set.

When a new minimally true point is found, the maximal candidate set is updated to preserve the invariant stated earlier. Recall that all minimally true points for the predicate (Prec≥$\tau$) are examined, and the one with maximum recall is selected. In practice, there is a large variation in the recall of minimally true points. In other words, there are typically a few points with high recall and a large number of points with relatively low recall.

This variation arises since the record pairs in (R×S) are not uniformly distributed in the similarity space. A point is called a candidate if it is a minimally true point for the predicate (Prec≥$\tau$). In general, embodiments of record matching module (embodiment #2) 145 find a candidate with recall r and then focuses on regions of the similarity space with recall>r and searches for candidates.

In order to efficiently search for candidates, embodiments of the module 145 use the anti-monotonic property of recall stated above. Namely, for any two points, $$p_1 \preceq p_2,$$

implies that Recall ($p_1$)≥Recall ($p_2$). Equivalently, the predicate Recall( )<r is monotonic. If $p_{mt}$ is a candidate with Recall ($p_{mt}$)>r, then there exists a maximally false point p of the predicate Recall( )<r such that, $$p_{mt} \preceq p.$$

Also, from the monotonicity assumption, Prec(p)≥$\tau$.

Based on the above observation, the embodiments of the module 145 consider points p in MaxFalse(Recall( )≤r). If there exists a p such that Prec(p)≥$\tau$, then embodiments of the module 145 use (p, Prec( )≥$\tau$) to find a candidate having recall r'>r. Embodiments of the module 145 search for candidates having recall>r'.

III.C.3. S-Term Disjunctive Normal Form (DNF) Learning Technique

Figure 5:
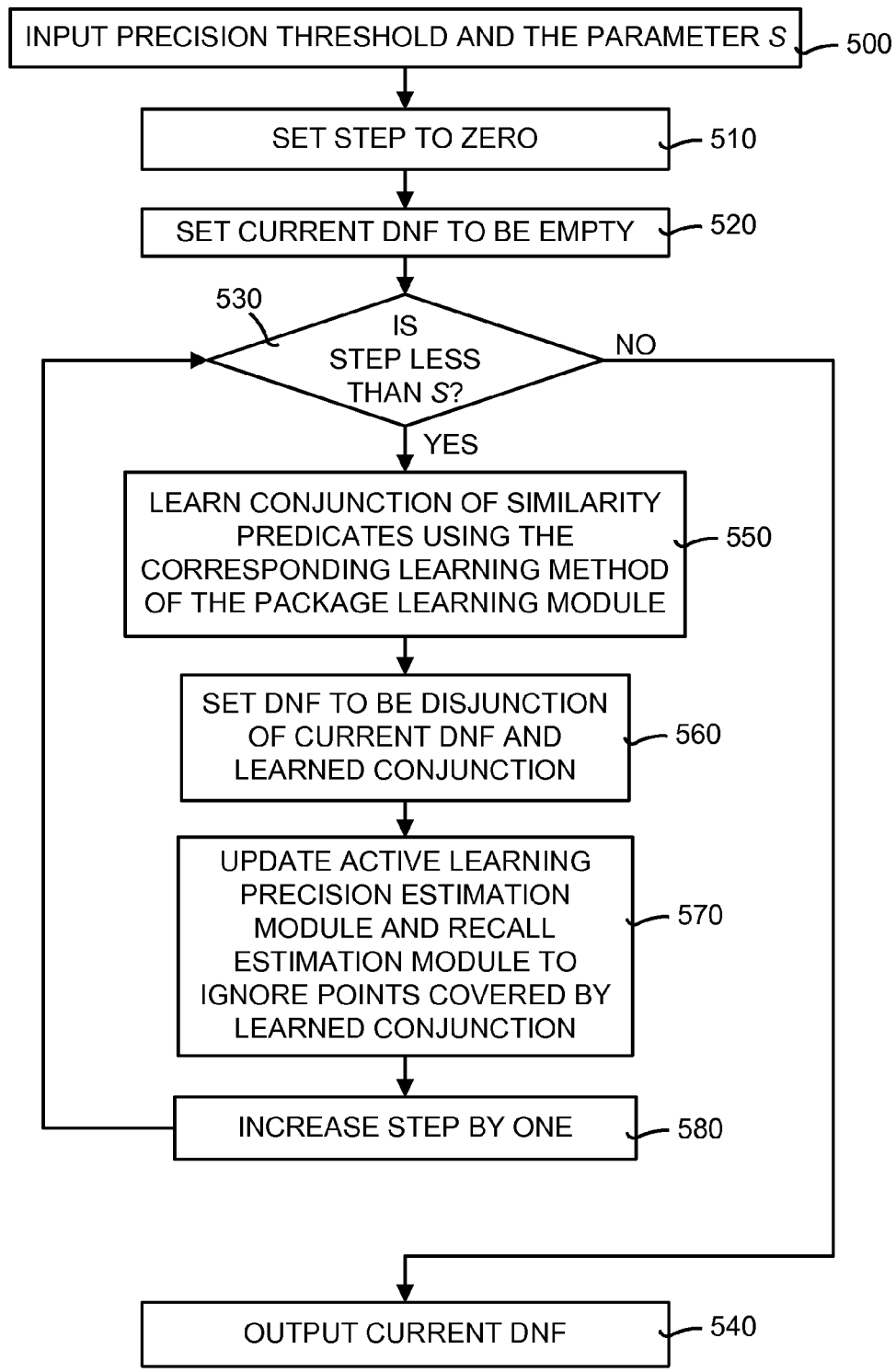
FIG. 5 is a flow diagram illustrating the details of the s-term DNF learning technique used in some embodiments of the package learning module shown in FIGS. 1 and 3 for a second package type.

When the package type is an s-term DNF, then embodiments of the package learning module 145 use an s-term DNF technique to learn the package. FIG. 5 is a flow diagram illustrating the details of the s-term DNF learning technique used in some embodiments of the package learning module shown in FIGS. 1 and 3 for a second package type. The operation begins by inputting the precision threshold and a parameter s (box 500). In addition, a step is set to zero (box 510) and the current DNF is set to be empty (box 520).

Next, a determination is made as to whether the step is less than s (box 530). If not, then the current DNF is output (box 540). Otherwise, the technique learns the conjunction of similarity predicates using the conjunction-of-similarity predicates learning technique set forth above (box 550). The s-term DNF technique then sets the DNF to be a disjunction of the current DNF and the learned conjunction (box 560).

The s-term DNF learning technique then updates the active learning precision estimation module 135 and the recall estimation module 140 in order to ignore points in future iterations that were covered by the learned conjunction (box 570). Next, the step is increased by one (box 580). The technique then again makes a determination as to whether the step is less than s (box 530). If so, then the iteration begins again. If not, then the current DNF is output (box 540).

Mathematically, an s-term disjunctive normal form (DNF) is of the form, $$\mathcal{M}_1 \vee \ldots \vee \mathcal{M}_s$$

where each $M_i$ is a conjunction of similarity thresholds. For example, $$(Jaccard(Name) \geq 0.9) \vee ((Edit(Street) \geq 0.7) \wedge (Jaccard(City) \geq 0.6))$$

is a 2-term DNF.

The s-term DNF learning technique uses a simple greedy algorithm for learning an s-term DNF, $$(\mathcal{M}_1 \vee \ldots \vee \mathcal{M}_s).$$

The technique proceeds in s steps and the binary function $M_i$ is learned in the ith step.

Mathematically, let, $$p^{(1)}, \ldots, p^{(i-1)}$$

denote the points in $[0, 1]^d$ corresponding to the functions, $$\mathcal{M}_1, \ldots, \mathcal{M}_{(i-1)},$$

respectively, which were learned in the previous (i−1) steps. For any point p, let, $$(p - p^{(1)} - \ldots - p^{(i-1)})$$

denote the region of the similarity space containing all points p' such that, $$p' \succeq p$$

and $$\forall j (1 \leq j < i) p' \not\succeq p^{(j)}.$$

To learn $M_i$, some embodiments of the s-term DNF learning technique include the following modification. Namely, instead of computing precision (or recall) of a point p, the precision (or recall) is computed of the region, $$(p - \bar{p}^{(1)} - \ldots - p^{(i-1)}).$$

It can be shown that the resulting s-term DNF, $$(\mathcal{M}_1 \vee \ldots \vee \mathcal{M}_s)$$

has precision $> \tau$.

III.C.4. Blocking Module

For large record matching instances, it is inefficient to consider all pairs of candidate records, classify them as a match or non-match, and output those classified as a match. Blocking is a heuristic filtering step that selects a subset of candidate pairs of records, and only the selected pairs are considered for subsequent classification. A useful blocking scheme has an efficient implementation and eliminates few true matches.

III.C.4.a. Integrated Blocking and Active Learning

Embodiments of the active learning record matching system 100 and method include the blocking module 130 that uses an integration of blocking into the learning problem and enables embodiments of the active learning record matching system 100 and method to handle large inputs. Given a blocking scheme, embodiments of the active learning record matching system 100 and method learn a classifier that when used in conjunction with the blocking scheme has maximum recall and precision above a specified threshold. This integration of blocking and active learning reduces the number of labeling requests.

By way of example, assume that the first letter blocking scheme described above is used for record matching. An active learning algorithm without knowledge of this blocking scheme might request a label for a pair that does not agree on the first letter, and the labeling effort on that pair is wasted since such pairs would never be considered for classification.

III.C.4.b. Efficiency Considerations

For large inputs R and S, it is impractical to enumerate all pairs, $$(r,s) \in R \times S,$$

classify them using a learned classifier M, and output the matches. As mentioned above, the one approach to scaling record matching to large inputs involves the use of blocking as a pre-filtering step. A blocking scheme quickly identifies a relatively small subset of record pairs, and only these pairs are considered for subsequent classification.

Mathematically, a blocking scheme is defined as a binary function, $$\mathcal{B}: R \times S \to \{true, false\},$$

with the property that the set of all, $$(r,s) \in R \times S$$

such that, $$\mathcal{B}(r,s) = true$$

can be efficiently computed. It should be noted that the definition of a blocking function as used herein is fairly general. In particular, a blocking function can be a string similarity predicate such as $(Jaccard \geq \theta)$ and, more generally, a disjunction of a small number of such predicates. When a blocking function B is used in conjunction with classifier M, the end-to-end record matching package corresponds to the binary function, $$(\mathcal{B} \wedge \mathcal{M}).$$

Blocking is integrated into the learning problem contained in some embodiments of the active learning record matching system 100 and method by providing the learning algorithm knowledge of the blocking function B. Mathematically, the modified learning problem is as follows. Given, $$R, S, \bar{F}, \text{ and } \tau,$$

and a blocking function B, identify a binary function, M, such that the precision of, $$(\mathcal{B} \wedge \mathcal{M})$$

is at least τ and the recall of, $$(\mathcal{B} \wedge \mathcal{M})$$

is maximized.

There are at least two advantages to integrating blocking with learning. First, it allows the learning algorithm to scale to large inputs. In fact, previous active learning algorithms can also be modified to exploit blocking and scale to larger inputs. Second, the integration eliminates inefficiencies in learning since the learning algorithm can avoid seeking labels for pairs (r, s) such that B(r, s)=false.

III.C.5. Precision and Recall

The specific implementation of precision and recall oracles will now be discussed. This includes the active learning precision estimation module and the recall estimation module 140.

III.C.5.a. Active Learning Precision Estimation Module

Figure 6:
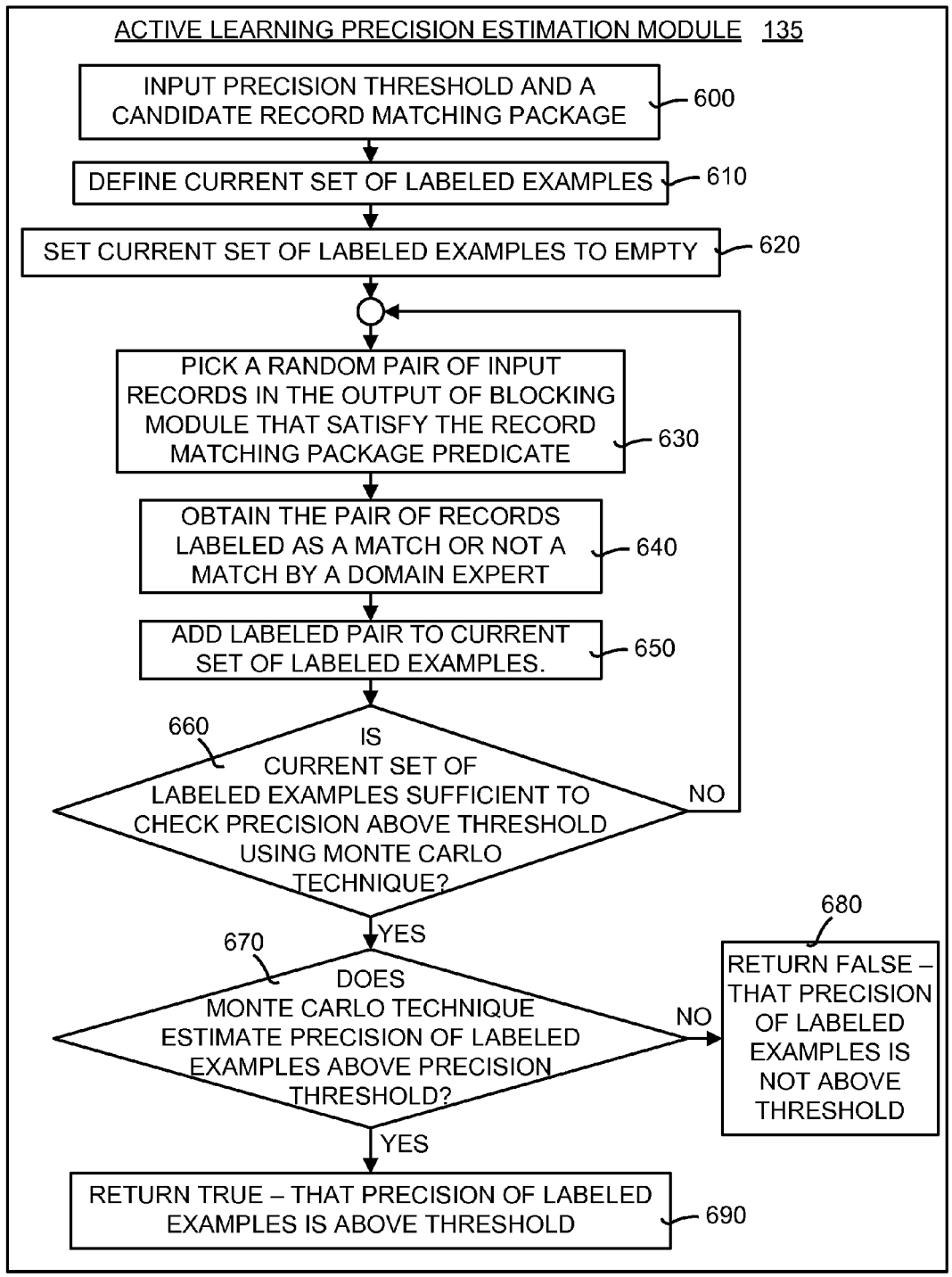
FIG. 6 is a flow diagram illustrating the operational details of embodiments of the active learning precision estimation module shown in FIG. 1.

The specific implementation of precision and recall oracles will now be discussed. This includes the active learning precision estimation module and the recall estimation module 140. FIG. 6 is a flow diagram illustrating the operational details of embodiments of the active learning precision estimation module 135 shown in FIG. 1. The precision estimation module is invoked once for each candidate record matching package considered by the learning method 145. The operation begins by input the precision threshold and a candidate record matching package (box 600). Next, a current set of labeled examples is defined (box 610). In addition, the current set of labeled examples is set to empty (box 620).

The module 135 then picks a random pair of input records from the output of the blocking module 130 (box 630). This random pair of input records is selected based on whether they satisfy the record matching package predicate. Next, the pair of records are labeled by a domain expert 160 as either a match or as not a match (box 640). The labeled pair then is added to the set of labeled examples (box 650).

A determination then is made as to whether the current set of labeled examples is sufficient to check the precision above the precision threshold (box 660). In some embodiments, this is performed using the Monte Carlo technique. If not, then the module 135 picks another random pair of input records that satisfy the record matching predicate (box 630) and continue processing as set forth above. If so, then the Monte Carlo technique is used and another determination is made as to whether the Monte Carlo technique estimated that the precision of the labeled examples is above the precision threshold (box 670). If not, then the module 135 returns a FALSE indication, meaning that the precision of the labeled examples is not above the precision threshold (box 680). If so, then the module 135 returns a TRUE if indication, meaning that the precision of labeled examples is above the precision threshold (box 690).

III.C.5.b. Recall Estimation Module

Figure 7:
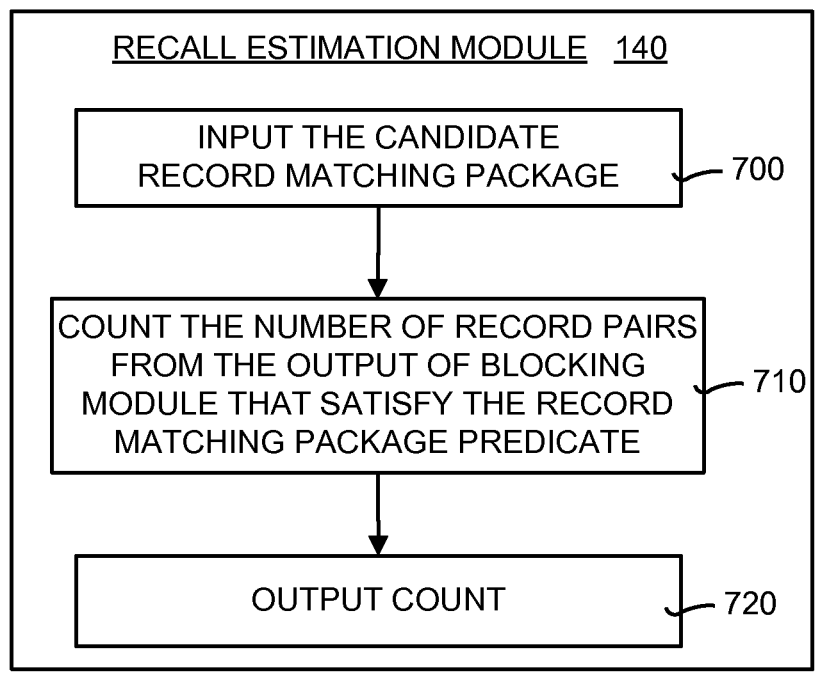
FIG. 7 is a flow diagram illustrating the operational details of embodiments of the recall estimation module shown in FIG. 1.

FIG. 7 is a flow diagram illustrating the operational details of embodiments of the recall estimation module 140 shown in FIG. 1. The recall estimation module is invoked once for each candidate record matching package considered by the learning method 145. The operation begins by inputting the candidate record matching package (box 700). The module 140 then counts the number of record pairs in the output of the blocking module that satisfy the record matching package predicate (box 710). The count then is output from the module 140 (box 720).

III.C.5.c. Computing Precision and Recall

The specific mathematical details of the precision and recall oracles will now be discussed. The precision and recall oracles take as input a binary (classifier) function, M, and output the precision and recall of the function, respectively. The techniques used herein do not compute precision values exactly, rather they estimate these values using sampling techniques. The estimated values are only probabilistically approximate, but this suffices for record matching applications.

Estimating the precision and recall values for a binary function, M, is generally difficult for large input tables R and S, even for a limited class of functions. More specifically, usually these are similar computational issues faced when trying to use M for record matching. In other words, identifying all pairs of records, $$(r,s) \in R \times S$$

such that M(r, s)=true.

In some embodiments of the active learning record matching system 100 and method, precision and recall oracles exploit the existence of the blocking function B in the problem formulation. In other words, only record matching packages of the form, $$\mathcal{B} \wedge \mathcal{M}$$

are sought.

When the precision oracle (or the recall oracle) gets a request for estimating the precision of a function, M, it simply returns an estimate for the precision (or recall) of the function, $$(\mathcal{B} \wedge \mathcal{M}).$$

In other words, it can be shown that with this modified implementation of the precision and recall oracles, with high probability the function, M will satisfy, $$\text{Prec}(\mathcal{B} \wedge \mathcal{M}) \geq \tau \pm \epsilon$$

(which approximates the specified threshold τ by ϵ) and the recall of, $$(\mathcal{B} \wedge \mathcal{M})$$

will be maximum modulo this approximation.

Next, it will be discussed how to estimate the precision and recall of $$(\mathcal{B} \wedge \mathcal{M})$$

for an arbitrary binary function, M, and a blocking function B. In a preprocessing step, some embodiments of the active learning record matching system 100 and method evaluate the blocking function B over R and S and materialize the set of all pairs, $$(r,s) \in R \times S$$

such that B(r, s)=true. By the definition of the blocking function, this evaluation is efficient, which also implies that the number of such pairs is relatively small. In the description below, this set is denoted using B(R, S).

Some embodiments of the active learning record matching system 100 and method use standard Monte-Carlo estimation techniques to estimate the precision of, $$(\mathcal{B} \wedge \mathcal{M}).$$

In particular, a random sample of pairs, $$(r,s) \in R \times S$$

is identified that satisfy the predicate, $$(\mathcal{B} \wedge \mathcal{M})$$

and seek labels from the user for the pairs in the sample. The fraction of pairs labeled as a match is an estimate for the precision of, $$B \wedge M.$$

To identify a random sample of pairs that satisfy, $$(B \wedge M),$$

B(R, S) is first scanned, the subset of pairs that satisfy, M, are identified, and a sample is obtained from this subset. The number of samples required can be thus reduced, and therefore the labeling effort by exploiting the fact that embodiments of the active learning record matching system 100 and method require precision only to check if it is above or below the threshold τ. For computing recall of, $$(B \wedge M),$$

B(R, S) is scanned and the number of pairs that satisfy M are counted.

III.C.5.d. Reusing Samples

Some embodiments of the active learning record matching system 100 and method use a modification to the sampling technique described above for estimating precision. This modification that significantly reduces the number of labeled pairs in practice.

Mathematically, a random permutation ττ of all pairs in R×S is fixed. In practice, this can be done using a random hash function over R×S and sorting the pairs by their hash values. To sample k points that satisfy the predicate, $$(B \wedge M),$$

a pair is selected from among all pairs, $$(r,s) \in R \times S$$

that satisfy, $$(B \wedge M),$$

the k smallest ones according to ττ. This modification preserves the probabilistic guarantees associated with precision estimation. Using a consistent ordering ττ of pairs in R×S increases the likelihood of an overlap in samples required for different precision estimations, which translates to fewer distinct label requests.

IV. Exemplary Operating Environment

Figure 8:
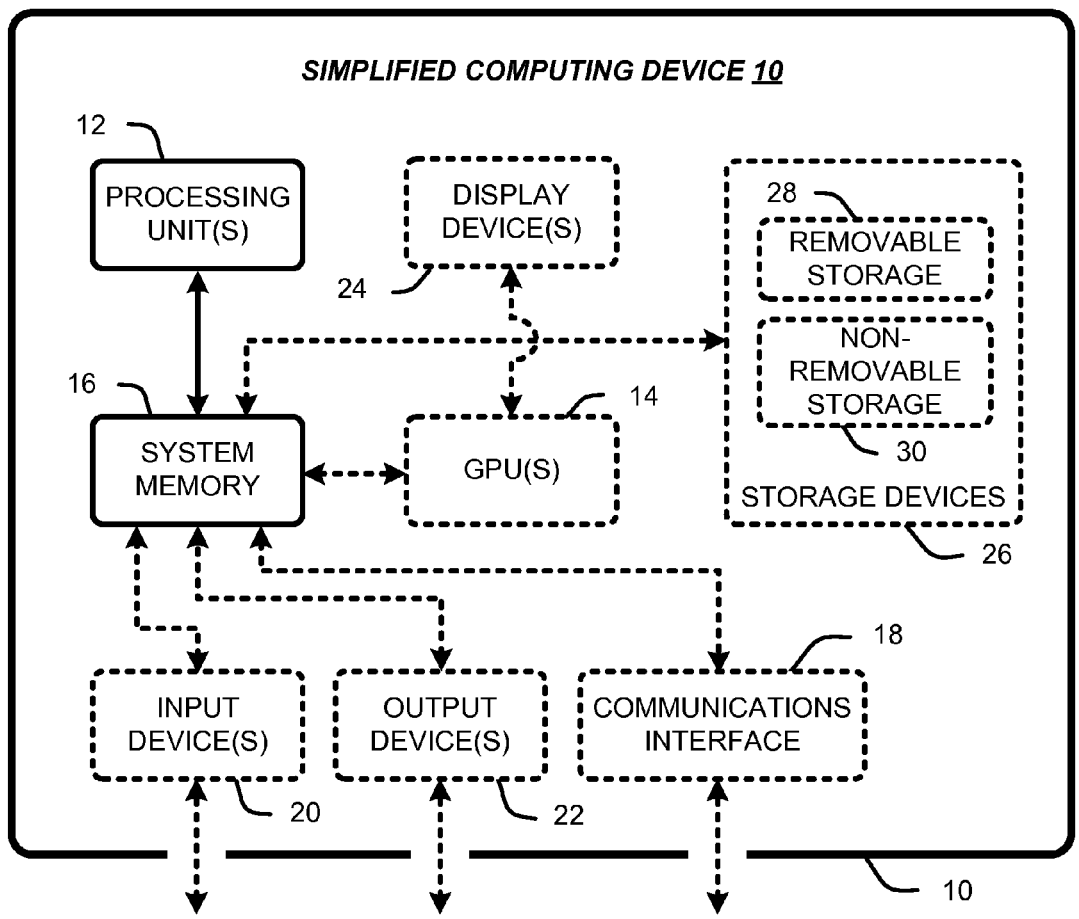
FIG. 8 illustrates a simplified example of a general-purpose computer system on which various embodiments and elements of the active learning record matching system and method, as described herein and shown in FIGS. 1-7, may be implemented.

Embodiments of the active learning record matching system 100 and method described herein are operational within numerous types of general purpose or special purpose computing system environments or configurations. FIG. 8 illustrates a simplified example of a general-purpose computer system on which various embodiments and elements of the active learning record matching system 100 and method, as described herein and shown in FIGS. 1-7, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the active learning record matching system 100 and method described herein, the device should have a sufficient computational capability and system memory to enable basic computational operations. In particular, as illustrated by FIG. 8, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 18. The simplified computing device of FIG. 8 may also include one or more conventional computer input devices 20 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 8 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the active learning record matching system 100 and method described herein, or portions thereof, may be stored, received, transmitted, or read from any desired combination of computer or machine readable media or storage devices and communication media in the form of computer executable instructions or other data structures.

Finally, embodiments of the active learning record matching system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying record matching packages comprising:
   identifying pairs of records from two input sets of records;
   having the pairs of records labeled by a human domain expert to obtain labeled pairs of records;
   selecting a learning method based on a package type for learning a record matching package; and
   using the labeled pairs of records to identify the record matching package that can identify matching records with a specified precision comprising the fraction of predicted record matches that are true matches.

2. The method of claim 1, further comprising:
   receiving a precision threshold as input; and
   ensuring that the learned record matching package can identify duplicate records from similar input with precision that is at least equal to the precision threshold.

3. The method of claim 2, further comprising using a blocking technique to restrict a space of record matching packages considered so as to facilitate scaling to large input sizes.

4. The method of claim 3, further comprising using a blocking function to precompute pairs of records from the two input sets of records for which the blocking function evaluates to true to obtain a precomputed output of the blocking function.

5. The method of claim 4, further comprising considering only record matching packages that can be expressed as a conjunction of the blocking function and another predicate.

6. The method of claim 5, further comprising:
   selecting a random sample of record pairs from an output of a candidate record matching package;
   having the random sample of record pairs labeled by a domain expert; and
   using a Monte-Carlo estimation to estimate a precision of the candidate record matching package.

7. The method of claim 5, further comprising evaluating a candidate record matching package predicate on the precomputed output of the blocking function to compute a recall of a candidate record matching package.

8. The method of claim 1, further comprising:
   determining that the package type is a conjunction-of-similarity predicates package type; and
   learning the record matching package using a conjunction-of-similarity predicates learning method to obtain the learned record matching package.

9. The method of claim 8, further comprising:
   considering several candidate record matching packages that are conjunctions of similarity predicates and a blocking function; and
   selecting a record matching package having a maximum recall and a precision at least equal to a precision threshold.

10. The method of claim 9, further comprising using a monotonicity of precision heuristic to reduce a number of candidate record matching packages that need to be considered.

11. The method of claim 1, further comprising:
    determining that the package type is an s-term disjunctive normal form package type; and
    learning the record matching package using an s-term disjunctive normal form learning method to obtain the learned record matching package.

12. The method of claim 11, further comprising using techniques of a learning conjunction of similarity predicates package repeatedly to learn a package involving an s-term disjunctive normal form.

13. A method for finding a record matching package from a first set of records and a second set of records, comprising:
    defining a precision threshold for matching records with a specified precision comprising the fraction of predicted record matches that are true matches;
    identifying a first record pair from the first set of records and a second record pair from the second set of records;
    manually labeling the first record pair and the second record pair using a human domain expert to obtain labeled record pairs; and
    learning the record matching package using a learning method that is selected based on a package type of the record matching package and the labeled record pairs.

14. The method of claim 13, further comprising ensuring that the first record pair and the second record pair satisfy a blocking function.

15. The method of claim 14, further comprising:
    precomputing pairs of records from the first set of records and the second set of records using the blocking function for which the blocking function evaluates to true to obtain a precomputed output of the blocking function; and
    considering only candidate record matching packages that can be expressed as a conjunction of the blocking function and another predicate.

16. The method of claim 15, further comprising evaluating a candidate record matching package predicate on the precomputed output of the blocking function to compute a recall of the candidate record matching packages.

17. The method of claim 13, further comprising:
    determining the learning method based on a package type of the record matching package to obtain a selected learning method;
    if the package type is a conjunction-of-similarity predicates package type, then using a conjunction-of-similarity learning method as the selected learning method; and if the package type is an s-term disjunctive normal form package type, then using an s-term disjunctive normal form learning method as the selected learning method.

18. An active learning record matching system for identifying a record matching package, comprising:
- a computing device;
- a computer program comprising program modules executed by the computing device, comprising,
- a blocking module that selects a first set of records and a second set of records that satisfies a blocking function;
- an active learning precision estimation module that generates labeled record pairs by selecting a random sample of record pairs from an output of candidate record matching packages and having the random sample of record pairs labeled by a domain expert;
- a recall estimation module that evaluates a candidate record matching package predicate on a precomputed output of the blocking function to compute a recall of the candidate record matching packages; and
- a package learning module that generates a record matching package using a learning method that is selected based on a package type, the labeled record pairs, and a precision threshold that represents a minimum amount of precision desired in record matching and comprises the fraction of predicted record matches that are true matches, to identify the record matching package.

19. The active learning record matching system of claim 18, further comprising:
- a conjunction-of-similarity predicates learning method that is used to generate the record matching package if the package type is a conjunction-of-similarity predicates learning package type; and
- an s-term disjunctive normal form learning method that is used to generate the record matching package if the package type is an s-term disjunctive normal form package type.

* * * * *